US007305068B2

(12) United States Patent
Tucker et al.

(10) Patent No.: US 7,305,068 B2
(45) Date of Patent: Dec. 4, 2007

(54) TELEPHONE COMMUNICATION WITH SILENT RESPONSE FEATURE

(75) Inventors: Roger Cecil Ferry Tucker, Chepstow (GB); Paul St John Brittan, Claverham (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 11/066,984

(22) Filed: Feb. 25, 2005

(65) Prior Publication Data

US 2005/0141680 A1   Jun. 30, 2005

Related U.S. Application Data

(62) Division of application No. 10/456,242, filed on Jun. 6, 2003.

(30) Foreign Application Priority Data

Jun. 7, 2002   (GB) .................. 0213021.9

(51) Int. Cl.
*G10L 15/00*   (2006.01)
*H04M 1/64*   (2006.01)
*H04B 1/38*   (2006.01)

(52) U.S. Cl. ............... 379/88.11; 704/264; 379/88.01; 379/88.08; 379/52; 455/563

(58) Field of Classification Search ................ 379/52, 379/88.11, 88.01, 88.08; 704/246; 455/563
See application file for complete search history.

(56) References Cited

U.S. PATENT DOCUMENTS

| 5,327,486 | A | | 7/1994 | Wolff et al. ............... 379/93.23 |
| 5,995,590 | A | | 11/1999 | Brunet et al. ................ 379/52 |
| 6,014,429 | A | | 1/2000 | LaPorta et al. ........... 379/88.15 |
| 6,044,134 | A | * | 3/2000 | De La Huerga .......... 379/88.08 |
| 6,151,572 | A | * | 11/2000 | Cheng et al. ................ 704/235 |
| 6,307,921 | B1 | * | 10/2001 | Engelke et al. ............... 379/52 |
| 6,404,860 | B1 | | 6/2002 | Casellini ................... 379/88.17 |
| 6,577,859 | B1 | * | 6/2003 | Zahavi et al. ............. 455/412.1 |
| 6,594,347 | B1 | | 7/2003 | Calder et al. ............. 379/88.01 |

(Continued)

FOREIGN PATENT DOCUMENTS

DE   100 52 368 A1   5/2002

(Continued)

OTHER PUBLICATIONS

Nelson L., et al., "Quiet Calls: Talking Silently on Mobile Phones;" *Conference on Human Factors in Computing*, Mar.-Apr. 2001, vol. 3, Issue No. 1, pp. 174-181.

*Primary Examiner*—Fan Tsang
*Assistant Examiner*—Lisa Hashem

(57) ABSTRACT

A telephone call may be received or made by the user of telephony-enabled apparatus in circumstances, such as during a meeting, where spoken responses by the user to what the other party to the call has said are unacceptable. A telephony method and arrangement are disclosed which permits a user to use silent input to the telephony-enabled apparatus in order to generate a response to the other party to the call. Response generation is facilitated by enabling the user to effect a selection from the content of the other party's input, or from options derived from that input, with this selection then being used in forming the response.

33 Claims, 3 Drawing Sheets

U.S. PATENT DOCUMENTS

| | | | |
|---|---|---|---|
| 6,606,598 B1* | 8/2003 | Holthouse et al. | 704/275 |
| 6,701,162 B1* | 3/2004 | Everett | 455/556.1 |
| 6,763,089 B2* | 7/2004 | Feigenbaum | 379/52 |
| 6,816,577 B2 | 11/2004 | Logan | 379/88.13 |
| 6,823,184 B1* | 11/2004 | Nelson | 455/418 |
| 6,839,669 B1* | 1/2005 | Gould et al. | 704/246 |
| 7,106,852 B1* | 9/2006 | Nelson et al. | 379/387.01 |
| 2002/0001368 A1* | 1/2002 | Smith et al. | 379/52 |
| 2002/0042262 A1* | 4/2002 | Aveling | 455/412 |
| 2002/0067808 A1 | 6/2002 | Agraharam et al. | 379/88.14 |
| 2002/0181671 A1 | 12/2002 | Logan | 379/88.13 |
| 2003/0040901 A1 | 2/2003 | Wang | 704/4 |
| 2003/0097262 A1 | 5/2003 | Nelson | 704/235 |
| 2003/0103608 A1 | 6/2003 | Pearson et al. | 379/88.18 |
| 2003/0228002 A1 | 12/2003 | Tucker et al. | 379/88.01 |
| 2004/0052342 A1 | 3/2004 | Jugovec et al. | 379/88.22 |
| 2004/0176114 A1 | 9/2004 | Northcutt | 455/466 |
| 2004/0196964 A1 | 10/2004 | Bluvband | 379/88.13 |
| 2006/0160530 A1* | 7/2006 | Tipley | 455/418 |
| 2006/0274682 A1* | 12/2006 | Luo | 370/310 |
| 2007/0098145 A1* | 5/2007 | Kirkland et al. | 379/201.01 |
| 2007/0100626 A1* | 5/2007 | Miller et al. | 704/258 |
| 2007/0127688 A1* | 6/2007 | Doulton | 379/265.01 |

FOREIGN PATENT DOCUMENTS

| | | |
|---|---|---|
| EP | 1 191 769 A2 | 3/2002 |
| JP | 08-163270 | 6/1996 |
| JP | 2002-152848 | 5/2002 |
| JP | 2003-5778 | 1/2003 |
| WO | WO 98/44708 | 10/1998 |
| WO | WO 99/60765 | 11/1999 |
| WO | 01/17275 A2 | 3/2001 |

* cited by examiner

TELEPHONE COMMUNICATION WITH SILENT RESPONSE FEATURE

CROSS-REFERENCE TO RELATED APPLICATIONS

This patent application is a divisional application of U.S. Ser. No. 10/456,242, filed on Jun. 6, 2003, which claims priority to UK Application No. 0213021.9, filed on Jun. 7, 2002.

FIELD OF THE INVENTION

The present invention relates to a method and arrangement for enabling a telephone user to respond silently during a telephone call.

BACKGROUND OF THE INVENTION

Telephone users often take calls in places where they cannot easily speak, but can listen reasonably discretely, especially using an earphone. In order to enable a user to give some sort of response to a caller, it is known (see, for example, WO 99/60765) to provide a number of different pre-recorded messages from which the user can select the most appropriate one once the user has seen who is calling. These messages can either ask for a message to be left, or ask for the caller to hold the line while they move somewhere to take the call. However, this is disruptive if the user is in a meeting or presentation, and in any case may not be possible.

It is an object of the present invention to provide better "silent" responses to input received by telephone.

SUMMARY OF THE INVENTION

According to one aspect of the present invention, there is provided a telephone communication method comprising the steps of:
(a) establishing a telephone call between a remote entity and telephony-enabled apparatus of the user;
(b) facilitating generation of a response to input from said entity to the telephony-enabled apparatus during the call, by enabling the user to effect a selection from the content of said input or from options derived therefrom;
(c) using silent user input to the telephony-enabled apparatus to generate said response by at least effecting a said selection; and
(d) sending the response back to said entity.

According to another aspect of the present invention, there is provided a telephone communication method comprising:
(a) establishing a telephone call between a remote entity and telephony-enabled apparatus of the user;
(b) converting voice input from said input into text and using this text with or without further processing, to represent the input from said entity to the user as displayed text on a visual display of the telephony-enabled apparatus;
(c) using silent user input to the telephony-enabled apparatus to generate a text-form response to the input from said entity, this silent user input being used at least to effect a selection from the displayed text; and
(d) converting the response to voice for return to said entity over the same channel as that used for the said input from the entity.

According to a further aspect of the present invention, there is provided a telephone communication arrangement for enabling a user of telephony-enabled apparatus to generate silently a response to input received from a remote entity during the course of a telephone call involving that entity and the apparatus, the arrangement comprising:
  apparatus output functionality adapted to avoid disturbing nearby persons when presenting output to the user;
  apparatus silent-input functionality for silent indication by the user of a desired selection from output of the output functionality;
  response-facilitation functionality for presenting, via said output functionality, call-related output comprising the content of said input or options derived therefrom; and
  response generation means for generating a response to said input by using at least a selection made by the user from said call-related output using the silent-input functionality.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
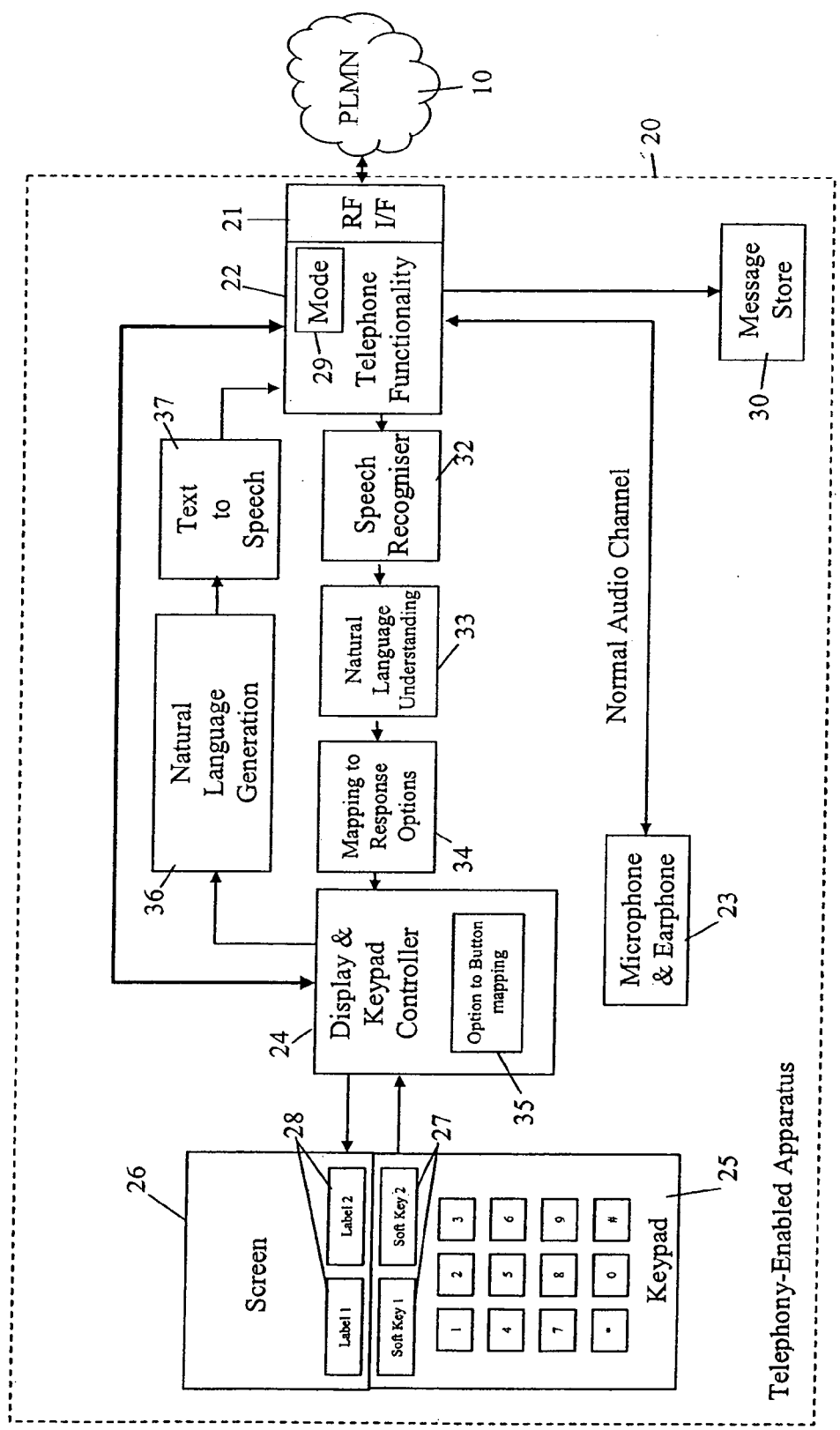
FIG. 1 is a diagram of a first embodiment of telephony-enabled apparatus in which voice input received over the apparatus is subject to speech recognition and analysis to provide possible responses for a user to choose between in generating a response silently.

In the following description, various implementations are disclosed for providing telephony-enabled apparatus with a silent response capability. As used herein, the term "telephony-enabled apparatus" is intended to include any device or aggregation of devices that provide a user with telephone functionality, whether this by traditional Public Switched Telephone Network (PSTN), by a Public Land Mobile Network (PLMN); by the use of IP-based telephony over the Internet or other compute network; or by similar means. Thus, for example and without limitation, the term "telephony-enabled apparatus" encompasses a traditional fixed line phone, a dedicated cellular mobile phone, and a PDA (Personal Digital Assistant) provided with functionality for accessing a telephone network (such as a cellular radio interface for accessing a PLMN or a "Bluetooth" short-range radio subsystem for connecting to a fixed unit connected to a telephone network).

Furthermore, whilst a silent response capability is most likely to be used when a user of telephony-enabled apparatus receives a call in circumstances where a spoken exchange would be inappropriate, it will be appreciated that a silent response capability can also be used where the call has been initiated by the party using the silent response capability.

Turning now to a consideration of the FIG. 1 embodiment, in this embodiment a user is provided with telephony-enabled apparatus 20 in the form of a cellular mobile phone capable of receiving/making calls via a PLMN 10 and provided with sufficient processing power to effect various speech recognition and generation tasks mentioned hereinafter.

More particularly, the apparatus 20 comprises the following elements for providing standard mobile phone capability, namely: a radio interface 21 for interfacing with PLMN 10, telephone functionality 22, an audio interface subsystem 23 formed by a microphone and earphone (herein taken to encompass both a handset speaker or an earpiece) 23, a keypad 25, a display 26, and a display and keypad controller 24. The operation of these elements to provide standard phone operation is well understood by persons skilled in the art and therefore will not be further described herein. However, it is noted that in the present embodiment, the keypad 25 is provided with "soft keys" 27 each of which can be set by controller 24 to control a number of different functions or enable a particular option to be chosen, the current function or option associated with a key 27 being indicated by a corresponding label 28 shown on display 28. The use of soft keys 27 facilitates user operation of the apparatus 20.

In addition to acting in a normal mobile phone mode, the telephone functionality 22 can be set, via keypad 25 and controller 24, into other modes including a recording mode for recording and storing incoming calls in message store 30. The current mode is held in mode unit 29 of telephone functionality 22, the mode unit 29 also serving to control the functionality 22 as appropriate for the currently set mode.

In addition to its normal operating mode and a recording mode, the telephone functionality 22 can also be set in a silent answering mode in which the user can generate responses to voice input received during the course of a telephone call from a remote party (that is, a party at the other end of the call to the user of apparatus 20) by use of silent input—in the present example, by operation of keypad 25. To this end, the apparatus further comprises a speech recognizer 32 arranged to receive voice input from the remote party and turn it into text form, a natural language understanding unit 33 for receiving the output of the recognizer 32 and analyzing this output to extract semantic meaning, and a response-option generation unit 34 for generating possible response options based on the semantic meaning of the input. This latter unit 34 operates, for example, on the basis of a generic set of mappings between semantic input and corresponding response options. Thus the following inputs in quotation marks can be set to give rise to the indicated response options:

| | |
|---|---|
| "Do you agree?" | Yes\|No\|Partially |
| "This week or next?" | This week\|Next week\|Neither |
| "Are you free?" | Yes\|No |

The generic set of mappings can be extended by the user and stored in unit 34. The set of response options generated by the unit 34 are passed to the controller 24 where they are assigned to soft keys 27—that is, each response is mapped to a respective key, this mapping 35 being temporarily memorized and the response text displayed in a corresponding label 28.

The user is thus presented with response options to the input received from the remote party; generally, of course, the user will also be presented with the input itself in a manner adapted not to disturb persons nearby such as via the earphone of subsystem 23 or, in the text form produced by the recognizer 32, via the display 26. However, in appropriate circumstances, output of the full remote-party input can be omitted.

User can now select a desired response from those presented by pressing the appropriate soft key 27 to cause the corresponding text to be passed either directly or via a natural language generation unit 36 to a text-to-speech converter 37. The output from the text-to-speech converter 37 is passed to telephone functionality 22 for return to the remote party over the same channel as used for the input from the remote party.

As described above, the FIG. 1 apparatus can be used in a normal operating mode, in an recording mode for storing incoming calls, and in a silent response mode. FIG. 2 depicts a simplified state diagram showing the inter-relationship between the main states (modes) in which the telephone functionality can operate. More particularly, when no call is being received, the user can set the telephone functionality 22 either into a normal alert mode 40 in which the user is alerted to an incoming call by a standard ring tone or tune, or into a silent alert mode 41 in which the user is alerted silently to an incoming call (for example, by activation of a vibrator, not shown). Upon the user being alerted to an incoming call, the user can check the apparatus display for any identification of the caller and then choose one of the following options:

- to answer the call in a normal manner in which case the telephone functionality 22 is put into a "normal conversation" (normal operating) mode 42;
- to answer the call in a silent manner in which case the telephone functionality 22 is put into a "silent conversation" mode 42 in which the elements 32 to 37 are activated (in this case a synthesized message is preferably played to the remote party explaining that the user is listening but all responses will be generated as text and synthesized);
- to activate the message recording functionality of the apparatus in which case the telephone functionality 22 is put either into "record (N)" mode 44 or "record (S)" mode 45 according to whether the alert was received whilst in the normal alert mode or silent alert mode.

The user may also simply ignore the incoming call in which case the telephone functionality remains in its current alert mode 40 or 41.

Whilst in the normal conversation mode 42 or silent conversation mode 43, the user can change conversation mode (that is, from normal to silent or vice versa) or transfer the call to a record mode 44 or 45. Upon call termination, the telephone functionality reverts to one or other of the alert modes 40, 41 as indicated by the dashed arrows in FIG. 2.

Figure 2:
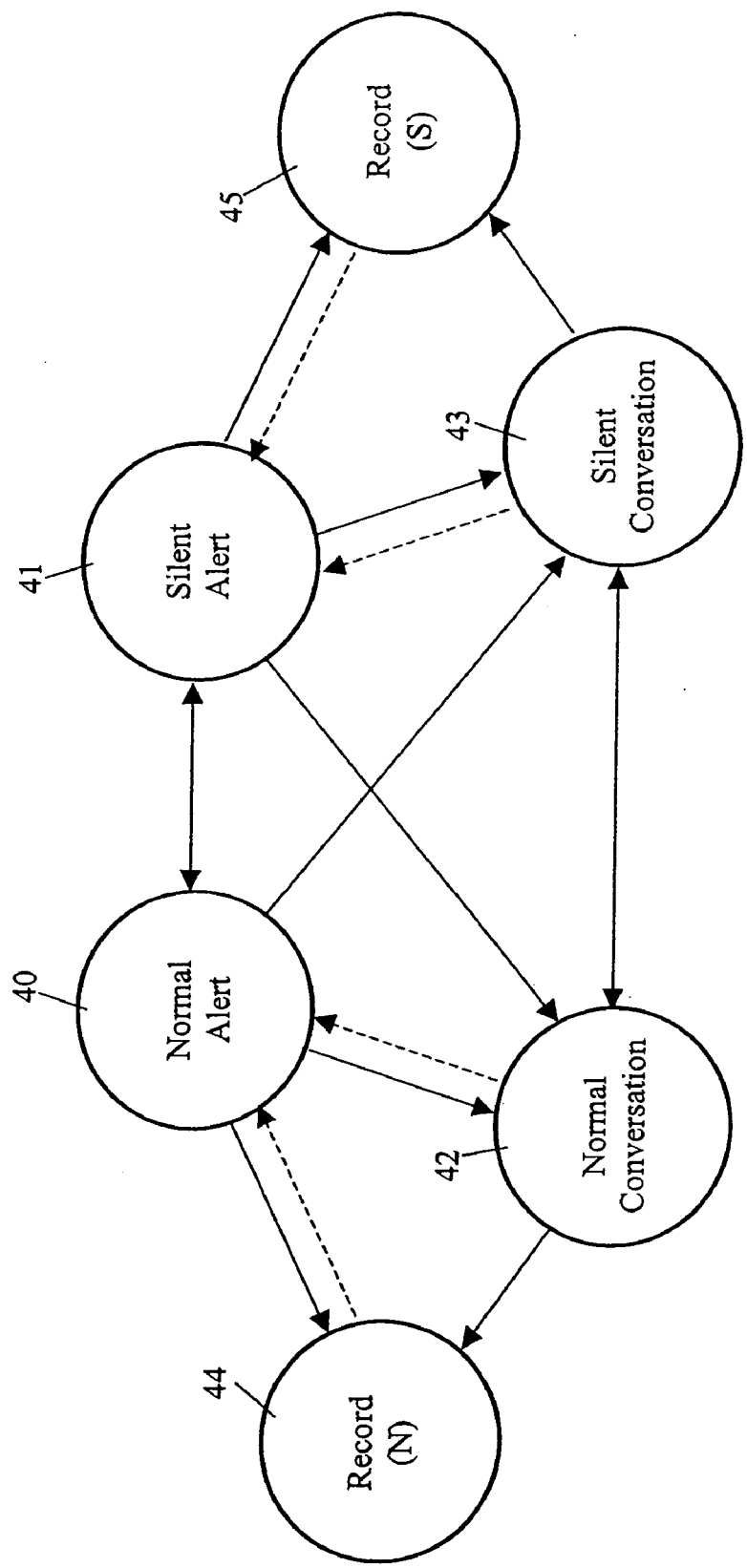
FIG. 2 is a simplified state transition diagram illustrating the operation of the FIG. 1 apparatus.

It will be appreciated that in the FIG. 1 embodiment substantial processing power is needed to implement the silent response elements 32 to 37 and, as a result, it may be desirable to restrict the domain in which the conversation is conducted—the remote party can be instructed as to this domain by an initial standard message played to that party upon the user deciding to answer a call in the silent conversation mode. An alternative solution to the issue of processing power is to implement apparatus 20 in the form of a PDA or other more powerful processing platform. A further alternative would be to provide the elements 32, 33, 36 and 37 in functionality of the telephone network itself with the apparatus being passed the response options (and generally also the original input) and feeding back the selected response to the network functionality concerned. This latter alternative can be effected in a telephone system with IN (Intelligent Network) capability by having "silent conversation" as a network service which is initiated by the user choosing the silent conversation mode.

Figure 3:
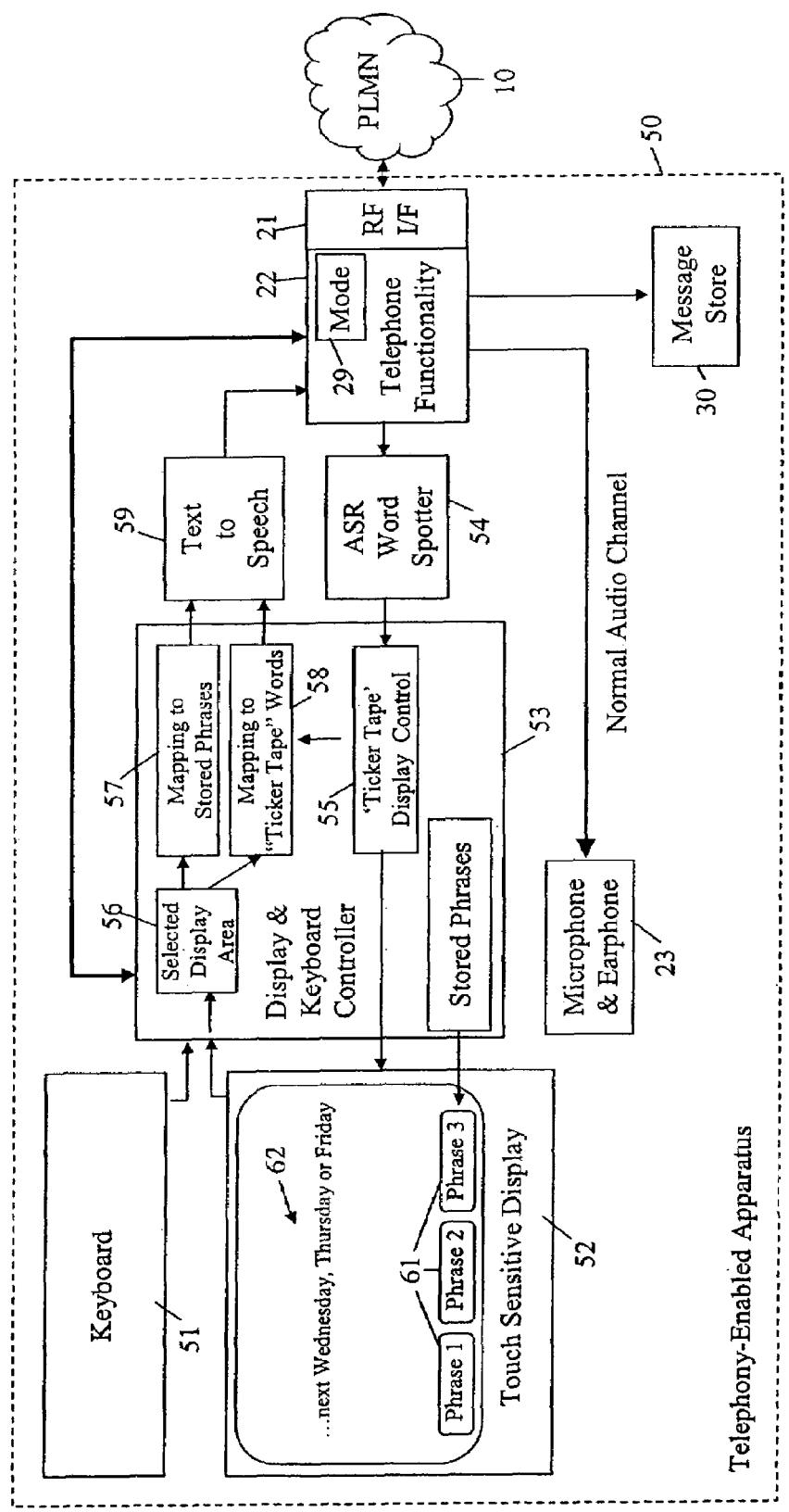
FIG. 3 is a diagram of a second embodiment of telephony-enabled apparatus in which voice input received over the apparatus is subject to speech recognition and display, the user generating a response silently by selecting portions of the displayed input for incorporation into the response.

The second embodiment, shown in FIG. 3, comprises telephony-enabled apparatus 50 in the form of a PDA with communications functionality for interfacing with PLMN 10. More particularly, the apparatus 50 comprises radio interface 21, telephone functionality 22, an audio interface subsystem 23, an optional keyboard 51, a display 52, and a display and keyboard controller 53, these elements interacting to provide normal mobile telephone functionality. In addition, the apparatus includes message recording functionality with message store 30, and elements 54 to 59 for providing a silent answering capability. The telephone functionality 22 includes a mode unit 29 which, like the mode unit 29 of the FIG. 1 embodiment, enables the telephone functionality to be set in various modes 40 to 45 (see FIG. 2) including a normal conversation mode 42 in which the user can talk and listen to a remote user during a telephone call through audio interface 23, record modes in which input from a remote user is recorded in message store 30, and a silent conversation mode in which elements 54 to 59 are activated to enable the user silently to generate responses to input from a remote party during a call.

The operation of the apparatus 50 in the silent conversation mode is as follows. Speech input from the remote party to a call is passed to an automatic speech recognition (ASR) word spotter 54 that is operative to pick out key words in the speech input. These key words are passed, in text form, to a "ticker tape" display control block 55 of controller 53 which serves to scroll these keywords across the screen of display 52 whilst keeping track of which word is where on the screen. The display 52 is also used to display a small set of pre-stored phrases 61 at fixed locations.

The voice input from the remote party can also be presented to the user via the earphone of the audio interface 23.

The display 52 is a touch sensitive display operative to pass screen coordinates of where it has been touched to a unit 56 that determines the general area of the screen and on this basis passes the touch coordinates either to a stored phrase mapping unit 57 or a "ticker tape to word" mapping unit 58. If the user has touched the screen at the location of a displayed stored phrase, the phrase concerned is output by unit 57, whilst if the user has touched the screen at the location of a currently displayed key word, this word is output by unit 58 (it being appreciated that the operation of the unit 58 is coordinated with that of the ticker tape display control 55). The outputs of the units 57 and 58 are fed to the input of a text-to-speech converter 59 which generates voice signals for return to the remote party over the same channel as the input received from that party.

The user can thus compose a response to input from the remote party by selecting key words from the user input (such as "Tuesday", "Wednesday", "Thursday") and combining them with standard phrases (such as "is OK", "is not OK").

Rather than the ASR 54 being a word spotting ASR, it could be a large vocabulary ASR arranged to output text corresponding to substantially the full input from the remote party; in this case, the full text of the input is displayed and the user can now select any input word or words for inclusion in the response. Where a large vocabulary ASR is used, the effect of recognition errors can be reduced in respect of a selected response word or words by indexing into the input audio and replaying it at the appropriate point in the response, rather than synthesizing the selected word or words.

It will be appreciated that many variants are possible to the above described embodiments of the invention. For example, in the first embodiment rather than having the natural language understanding unit 33 generate a set of possible responses based on its understanding of the received input, the unit 33 can be arranged to identify options present in the input and then individually identify these options (for example by number) for display; all the user now needs to do is select the desired option by number. Of course, where a touch sensitive display is used, or some other pointing arrangement is provided, it is not necessary to explicitly identify each option though each option should be clearly displayed as a separate choice. Furthermore, in order to encourage the remote party to provide voice input in the form of a series of options, the remote party can be played an initial message explaining that the user is answering in a silent response mode and the remote party should structure their input appropriately. Indeed, the apparatus 50 could be provided with functionality for facilitating the construction by the remote party of input with a list of options—for example, the unit 33 can simply be arranged to understand that when the word "option" is encountered, a new option is being started. More sophisticated approaches can be taken where the remote party effectively has an interactive dialog session with the apparatus to construct a list of options for presentation to the user. Where the remote party is constrained to provide individually identified options between which the user can choose, then it is possible to avoid having to effect speech recognition on the "optionised" input since this input can be presented in audio form to the user who then only has to identify the option chosen through the identification associated with it. This identification (for example, an option number) can simply be relayed back to the remote party, or it can be used to extract and replay to the remote party the voice passage corresponding to the selected option from the "optionised" voice input (this latter having been provided, for example as separate option passages).

As already mentioned with respect to the first embodiment, much of the silent response functionality can be placed in the telephone network (whether a traditional PSTN or PLMN network, or an IP or other data network), this being generally the case for all embodiments though the split of functionally between the telephony-enabled apparatus and network will vary between embodiments. Where the remote user is engaged in an interactive dialog to provide an "optionised" input, this is preferably done using an interactive voice response unit of the telephone network.

As regards the mechanism employed for silent input by the user, this can be key-based, pointing based (such as by a touch screen or mouse device), or any other suitable input device such as gaze-based input.

It will be appreciated that where a keypad or keyboard is provided by which words can be composed (possibly by multiple keystrokes per character), then the above-described selection-based response generation process can be supplemented by the inclusion of typed words.

Although in the described embodiments, the silently-generated responses have been converted from text form to voice signals by a text-to-speech converter before being forwarded to the remote party, the response could be forwarded to the remote party in text form over any channel available including mobile-phone short messaging, GPRS, instant messaging over IP, multimedia messaging or even modulated onto the outgoing voice path.

The invention claimed is:

1. A telephone communication method comprising:
   (a) establishing a voice telephony call between a remote entity and telephony-enabled apparatus of a user;
   (b) during the course of at least part of the call and at said user's choice, facilitating generation of a response to voice input from said entity to the call, by carrying out speech recognition and semantic analysis on said input to generate input-dependent response options at least some of which are not expressed in said input, these response options being presented to the user through the telephony-enabled apparatus;
   (c) using silent user input to the telephony-enabled apparatus to generate said response by at least selecting a said response from for use in the response; and
   (d) sending the response back to said entity.

2. A method according to claim 1, wherein said response options are presented to the user in text form on a display of, the telephony-enabled apparatus.

3. A method according to claim 1, wherein said response options are presented to the user in audible form through an earphone.

4. A method according to claim 1, wherein the input from said entity is presented to the user in audible form through an earphone, and the response options are presented to the user in text form on a display of the telephony-enabled apparatus.

5. A method according to claim 1, wherein said silent user input is effected through hard or soft keys of the telephony-enabled apparatus.

6. A method according to claim 1, wherein the response generated in step (c) is in text form and step (d) involves converting the text form response into speech for return to said entity over a same channel as that used for the said input from the entity.

7. A method according to claim 1, wherein the response generated in step (c) is in text form and step (d) involves returning the text form response to the said entity over a communication channel different from that used for the said input from the entity.

8. A telephone communication arrangement for enabling a user of telephony-enabled apparatus to generate silently a response to voice input received from a remote entity during a voice telephony call involving that entity and the apparatus, the arrangement comprising:
   apparatus output functionality adapted to avoid disturbing nearby persons when presenting output to the user;
   apparatus silent-input functionality for silent indication by the user of a desired selection from output of the output functionality;
   response-facilitation functionality arranged at the user's choice to facilitate, during at least a Tart of said call, generation of a response to said input from the remote entity to the call;
   the response-facilitation functionality comprising means for carrying out speech recognition and analysis on said input to generate input-dependent response options at least some of which are not expressed in said input, and means for presenting these response options via said output functionality to the user; and
   response generation means for generating a response to said input by using at least a selection made by the user from said response options using the silent-input functionality.

9. An arrangement according to claim 8, wherein the response-facilitation functionality is incorporated into the telephone apparatus.

10. An arrangement according to claim 8, wherein the response-facilitation functionality is part of a network infrastructure used by the telephone apparatus.

11. An arrangement according to claim 8, wherein the output functionality is a visual display for presenting said response options, in text form.

12. An arrangement according to claim 8, wherein the output functionality is an earphone for presenting said response options, in audible form.

13. An arrangement according to claim 8, wherein said silent input functionality comprises hard or soft keys of the telephone apparatus.

14. An arrangement according to claim 8, wherein said silent-input functionality is operative to generate said response in text form, the telephone apparatus further comprising means for converting the text form response into speech for return to said entity over a same channel as that used for the said input from the entity.

15. An arrangement according to claim 8, wherein said silent-input functionality is operative to generate said response in text form, the telephone apparatus further comprising means for returning the text form response to the said entity over a communication channel different from that used for the said input from the entity.

16. A telephone communication method comprising:
    (a) establishing a voice telephony call between a remote entity and telephony-enabled apparatus of a user;
    (b) during the course of at least part of the call and at said user's choice, facilitating generation of a response to voice input from said entity to the call, by carrying out speech recognition and analysis on said input to extract key portions, these key portions being presented to the user separately from the remainder of said input through the telephony-enabled apparatus;
    (c) using silent user input to the telephony-enabled apparatus to generate said response by at least selecting from said key portions for use in the response; and
    (d) sending the response to said entity.

17. A method according to claim 16, wherein said key portions are options present in the input, these options being presented to the user as individual options.

18. A method according to claim 16, wherein said key portions are presented to the user in text form on a display of the telephony-enabled apparatus.

19. A method according to claim 16, wherein said key portions are presented to the user in audible form through an earphone.

20. A method according to claim 16, wherein the input from said entity is presented to the user in audible form through an earphone, and the key portions extracted from said input are presented to the user in text form on a display of the telephony-enabled apparatus.

21. A method according to claim 16, wherein said silent user input is effected through hard or soft keys of the telephony-enabled apparatus.

22. A method according to claim 16, wherein the response generated in subparagraph (c) is in text form and sending the response to said entity involves converting the text form response into speech for return to said entity over a same channel as that used for the said input from the entity.

23. A method according to claim 16, wherein the response generated in subparagraph (c) is in text form and sending the response to the entity involves returning the text form response to the said entity over a communication channel different from that used for the said input from the entity.

24. A method according to claim 16, wherein the response generated in subparagraph (c) is in text form and sending the response to the entity involves converting the text form response into speech for return to said entity over a same channel as that used for the said input from the entity; at least the selected said key portion being converted to speech by using the corresponding part of the original voice input from said entity, this part having been stored and associated with the corresponding displayed text.

25. A telephone communication arrangement for enabling a user of telephony-enabled apparatus to generate silently a response to voice input received from a remote entity during the course of a voice telephony call involving that entity and—the apparatus, the arrangement comprising:
- apparatus output functionality adapted to avoid disturbing nearby persons when presenting output to the user;
- apparatus silent-input functionality for silent indication by the user of a desired selection from output of the output functionality;
- response-facilitation functionality arranged at the user's choice to facilitate, during at least a part of said call, generation of a response to said input from the remote entity to the call;
- the response-facilitation functionality comprising means for carrying out speech recognition and analysis on said input to extract key portions, and means for presenting these key portions via said output functionality to the user separately from a remainder of said input; and
- response generation means for generating a response to said input by using at least a selection made by the user from said key portions using the silent-input functionality.

26. An arrangement according to claim 25, wherein said key portions are options present in the input.

27. An arrangement according to claim 25, wherein the response-facilitation functionality is incorporated into the telephone apparatus.

28. An arrangement according to claim 25, wherein the response-facilitation functionality is part of a network infrastructure used by the telephone apparatus.

29. An arrangement according to claim 25, wherein the output functionality is a visual display for presenting said key portions in text form.

30. An arrangement according to claim 25, wherein the output functionality is an earphone for presenting said key portions in audible form.

31. An arrangement according to claim 25, wherein said silent input functionality comprises hard or soft keys of the telephone apparatus.

32. An arrangement according to claim 25, wherein said silent-input functionality is operative to generate said response in text form, the telephone apparatus further comprising means for converting the text form response into speech for return to said entity over a same channel as that used for the said input from the entity.

33. An arrangement according to claim 25, wherein said silent-input functionality is operative to generate said response in text form, the telephone apparatus further comprising means for returning the text form response to the said entity over a communication channel different from that used for the said input from the entity.

* * * * *